United States Patent
Martin (10) Patent No.: US 11,884,516 B2
(45) Date of Patent: Jan. 30, 2024

(54) HEALTH MONITORING OF ELEVATOR SYSTEM TENSION MEMBERS

(71) Applicant: Otis Elevator Company, Farmington, CT (US)

(72) Inventor: Kyle B. Martin, Avon, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1564 days.

(21) Appl. No.: 16/016,808

(22) Filed: Jun. 25, 2018

(65) Prior Publication Data

US 2019/0389696 A1 Dec. 26, 2019

(51) Int. Cl.
| | |
|---|---|
| *B66B 7/12* | (2006.01) |
| *B66B 9/00* | (2006.01) |
| *G01N 27/90* | (2021.01) |
| *G01N 27/904* | (2021.01) |
| *B66B 5/00* | (2006.01) |

(52) U.S. Cl.
CPC ............. *B66B 7/1223* (2013.01); *B66B 9/00* (2013.01); *G01N 27/904* (2013.01); *B66B 5/0018* (2013.01); *B66B 7/123* (2013.01)

(58) Field of Classification Search
CPC ....... B66B 7/1223; B66B 9/00; B66B 5/0018; B66B 7/123; B66B 7/1215; G01N 27/904
See application file for complete search history.

(56) References Cited

U.S. PATENT DOCUMENTS

| | | | |
|---|---|---|---|
| 5,414,353 A | 5/1995 | Weischedel | |
| 5,890,564 A * | 4/1999 | Olsen | B66B 7/1215 187/250 |

(Continued)

FOREIGN PATENT DOCUMENTS

| | | |
|---|---|---|
| CN | 105293242 A | 2/2016 |
| CN | 105929022 A | 9/2016 |

(Continued)

OTHER PUBLICATIONS

Vernon, S., "Eddy Current Inspection of Thick Carbon Fiber Reinforced Composites", Naval Surface Warfare Center Materials Evaluation Branch, Silver Spring, MD 20903-5000, vol. 8B, Chaper 8: Composites, Section Composites—Properties, pp. 1543-1550, Springer-Verlag US, Jan. 1989. DOI: 10.1007/978-1-4613-0817-1_194.

(Continued)

*Primary Examiner* — Christopher P McAndrew
*Assistant Examiner* — Zannatul Ferdous
(74) *Attorney, Agent, or Firm* — CANTOR COLBURN LLP (57) ABSTRACT

A health monitoring system for an electrically-conductive tension member of an elevator system belt includes a transmitter including a transmitter coil configured for placement at the tension member, a receiver configured to be positioned at the tension member, and a controller operably connected to the transmitter and the receiver. The controller is configured to direct an alternating current through the transmitter coil resulting in the generation of a magnetic field and eddy currents at the transmitter coil, evaluate fluctuations in the magnetic field detected at the receiver. The fluctuations are indicative of wear or damage to the tension member.

19 Claims, 7 Drawing Sheets

(56) References Cited

U.S. PATENT DOCUMENTS

| | | | |
|---|---|---|---|
| 7,560,920 B1* | 7/2009 | Ouyang | G01R 33/10 |
| | | | 324/242 |
| 9,075,022 B2 | 7/2015 | Huntley et al. | |
| 2009/0128169 A1* | 5/2009 | Fay | G01N 17/04 |
| | | | 324/700 |
| 2013/0214771 A1* | 8/2013 | Tiernan | G01N 27/904 |
| | | | 324/242 |
| 2015/0225894 A1 | 8/2015 | Grabandt et al. | |
| 2017/0023347 A1 | 1/2017 | Ouellette | |
| 2017/0038338 A1 | 2/2017 | Kondoh | |
| 2017/0292925 A1 | 10/2017 | Zhao et al. | |
| 2018/0162697 A1* | 6/2018 | Schmidt | B66B 7/085 |
| 2019/0301088 A1* | 10/2019 | Dudde | F16G 9/04 |
| 2020/0115987 A1* | 4/2020 | Rome | E21B 47/08 |
| 2021/0380372 A1* | 12/2021 | Iijima | G01N 27/82 |

FOREIGN PATENT DOCUMENTS

| | | |
|---|---|---|
| CN | 106315350 A | 1/2017 |
| DE | 102010048917 A1 | 4/2012 |
| EP | 2020394 B1 | 12/2017 |
| EP | 3336033 A1 | 6/2018 |
| JP | 2003050230 A | 2/2003 |
| JP | 2004333330 A | 11/2004 |
| WO | 2010098756 A1 | 9/2010 |
| WO | 2013062428 A1 | 5/2013 |
| WO | 2016143088 A1 | 9/2016 |

OTHER PUBLICATIONS

Yin, W., et al., "Noncontact Characterization of Carbon-Fiber-Reinforced Plastics Using Multifrequency Eddy Current Sensors", IEEE Transactions on Instrumentation and Measurement, vol. 58, No. 3, Mar. 2009, pp. 738-743, IEEE.
European Search Report Issued in EP Application No. 19182431.7, dated Nov. 12, 2019, 75 Pages.
Raine, et al, "A review of the alternating current field measurement inspection technique", Sensor Review, IFS Publications, Bedford, GB, Jan. 1, 1999 (Jan. 1, 1999), pp. 207-213, XP009177196, ISSN: 0260-2288, DOI: 10.1108/02602289910279166.
Chinese Office Action for Chinese Application No. 201910548626.9; dated Sep. 23, 2020; 11 pages.

* cited by examiner

HEALTH MONITORING OF ELEVATOR SYSTEM TENSION MEMBERS

BACKGROUND

Exemplary embodiments pertain to the art of elevator systems. More particularly, the present disclosure relates to inspection and/or health monitoring of tension members of elevator systems.

Elevator systems utilize a suspension member operably connected to an elevator car and a counterweight in combination with, for example, a machine and traction sheave, to suspend and drive the elevator car along a hoistway. In some systems, the suspension member is a belt having one or tension members retained in a jacket. The tension members may be formed from, for example, steel wires or other materials, such as a carbon fiber composite. The tension members support the load and the jacket hold the tension members and transfers shear forces to the traction sheave.

In a typical system having steel wire tension members, one way of inspecting the belt for wear and/or breakage of the steel wires is to utilize electrical resistance-based systems, where an electrical resistance of the tension member is measured. A change in the electrical resistance, or a resistance value other than expected is indicative of wear and/or breakage of steel wires of the tension member.

In systems using tension members of other constructions, such as those using carbon fiber composite tension members, electrical resistance does not show a strong correlation to fatigue cycling of the tension member. Further, in cases where damage is localized and the belt length is long, the increase in electrical resistance from the damage is not likely detectable as a percentage of total resistance.

BRIEF DESCRIPTION

In one embodiment, a health monitoring system for an electrically-conductive tension member of an elevator system belt includes a transmitter including a transmitter coil configured for placement at the tension member, a receiver configured to be positioned at the tension member, and a controller operably connected to the transmitter and the receiver. The controller is configured to direct an alternating current through the transmitter coil resulting in the generation of a magnetic field and eddy currents at the transmitter coil, evaluate fluctuations in the magnetic field detected at the receiver. The fluctuations are indicative of wear or damage to the tension member.

Additionally or alternatively, in this or other embodiments the controller is configured to identify a weakest location of the tension member.

Additionally or alternatively, in this or other embodiments the controller is configured to compare a present evaluation to one or more previous evaluations to determine progression of damage or wear of a tension member.

Additionally or alternatively, in this or other embodiments the system includes multiple sets of transmitters and receivers, each set configured to evaluate a portion of the belt.

Additionally or alternatively, in this or other embodiments the wear or damage includes one or more of breakage of the tension member, wrinkled fibers, variations in fiber density and/or amount of inter-fiber contact, or variations in a matrix material of the tension member.

In another embodiment, an elevator system includes a hoistway, an elevator car movable along the hoistway, and one or more electrically-conductive tension members operably connected to the elevator car to move the elevator car along the hoistway. A health monitoring system for the one or more tension members includes a transmitter including a transmitter coil located the tension member, a receiver located at the tension member, and a controller operably connected to the transmitter and the receiver. The controller is configured to direct an alternating current through the transmitter coil resulting in the generation of a magnetic field and eddy currents at the transmitter coil, and evaluate fluctuations in the magnetic field detected at the receiver. The fluctuations are indicative of wear or damage to the tension member.

Additionally or alternatively, in this or other embodiments the health monitoring system is configured for continuous monitoring of the tension member.

Additionally or alternatively, in this or other embodiments locations of wear or damage of the tension member is located on the tension member utilizing elevator control system position information.

Additionally or alternatively, in this or other embodiments the controller is configured to compare a present evaluation to one or more previous evaluations to determine progression of damage or wear of a tension member.

Additionally or alternatively, in this or other embodiments the system includes multiple sets of transmitters and receivers, each set configured to evaluate at least one tension member of the one or more tension members.

Additionally or alternatively, in this or other embodiments the sets of transmitters and receivers are staggered in location along the hoistway.

Additionally or alternatively, in this or other embodiments the tension member includes a plurality of fibers disposed in a matrix material.

Additionally or alternatively, in this or other embodiments the wear or damage includes one or more of breakage of fibers of the tension member, wrinkled fibers, variations in fiber density and/or amount of inter-fiber contact, or variations in a matrix material of the tension member.

Additionally or alternatively, in this or other embodiments the one or more tension members are retained in a jacket.

In yet another embodiment, a method of health monitoring of an electrically-conductive tension member of an elevator system includes directing an alternating current through a coil of a transmitter located at a tension member of an elevator system, generating one or more magnetic fields and eddy currents at the transmitter via the alternating current, and evaluating the tension member by detecting fluctuations in the magnetic field at a receiver located the tension member opposite the first side. The fluctuations are indicative of wear and or damage to the tension member.

Additionally or alternatively, in this or other embodiments a present evaluation is compared to one or more previous evaluations to determine progression of damage or wear of a tension member.

Additionally or alternatively, in this or other embodiments locations of wear or damage of the tension member on the tension member are determined utilizing elevator control system position information.

Additionally or alternatively, in this or other embodiments multiple tension members of the elevator system are evaluated via multiple sets of transmitters and receivers.

Additionally or alternatively, in this or other embodiments the tension member comprises a plurality of fibers located in a matrix material.

Additionally or alternatively, in this or other embodiments the wear or damage includes one or more of breakage of fibers of the tension member, wrinkled fibers, variations in fiber density and/or amount of inter-fiber contact, or variations in a matrix material of the tension member.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
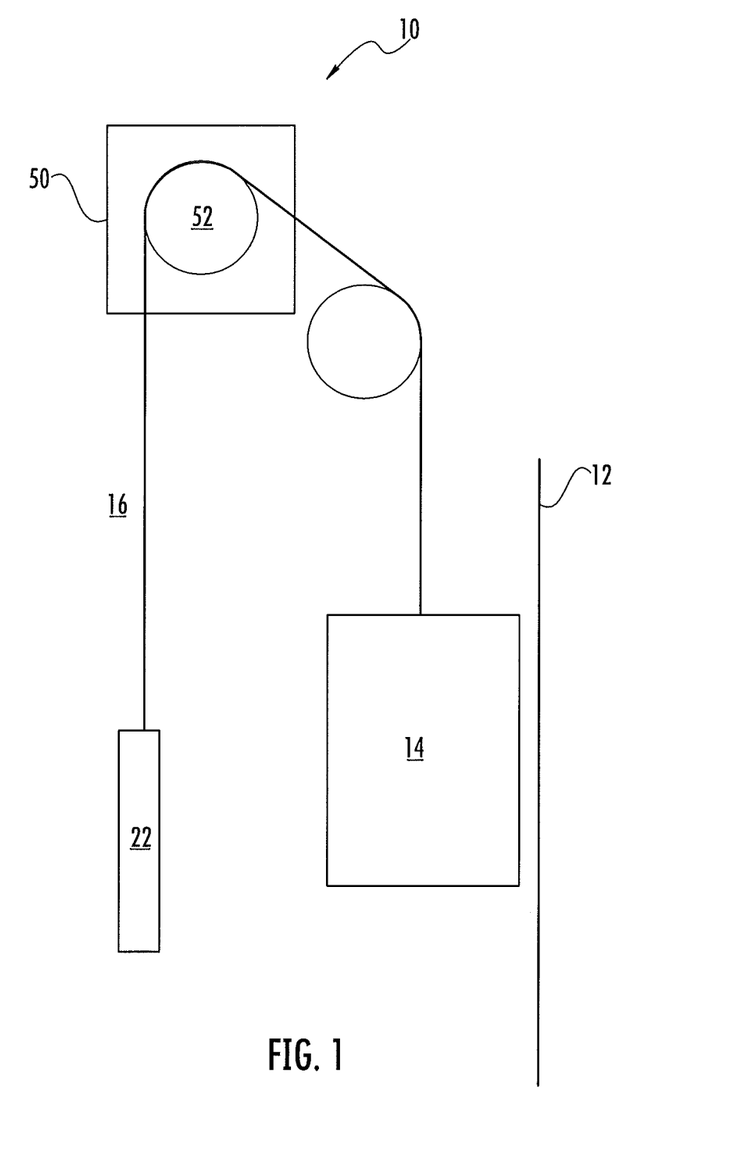
FIG. 1 is a schematic illustration of an elevator system.

Shown in FIG. 1 is a schematic view of an exemplary traction elevator system 10. Features of the elevator system 10 that are not required for an understanding of the present invention (such as the guide rails, safeties, etc.) are not discussed herein. The elevator system 10 includes an elevator car 14 operatively suspended or supported in a hoistway 12 with one or more suspension members, for example belts 16. While the following description, belts 16 are the suspension members utilized in the elevator system, one skilled in the art will readily appreciate that the present disclosure may be utilized with other suspension members, such as ropes. The one or more belts 16 interact with sheaves 18 and 52 to be routed around various components of the elevator system 10. Sheave 18 is configured as a diverter, deflector or idler sheave and sheave 52 is configured as a traction sheave, driven by a machine 50. Movement of the traction sheave 52 by the machine 50 drives, moves and/or propels (through traction) the one or more belts 16 that are routed around the traction sheave 52. Diverter, deflector or idler sheaves 18 are not driven by a machine 50, but help guide the one or more belts 16 around the various components of the elevator system 10. The one or more belts 16 could also be connected to a counterweight 22, which is used to help balance the elevator system 10 and reduce the difference in belt tension on both sides of the traction sheave during operation. The sheaves 18 and 52 each have a diameter, which may be the same or different from each other.

In some embodiments, the elevator system 10 could use two or more belts 16 for suspending and/or driving the elevator car 14 In addition, the elevator system 10 could have various configurations such that either both sides of the one or more belts 16 engage the sheaves 18, 52 or only one side of the one or more belts 16 engages the sheaves 18, 52.

The embodiment of FIG. 1 shows a 1:1 roping arrangement in which the one or more belts 16 terminate at the car 14 and counterweight 22, while other embodiments may utilize other roping arrangements.

The belts 16 are constructed to meet belt life requirements and have smooth operation, while being sufficiently strong to be capable of meeting strength requirements for suspending and/or driving the elevator car 14 and counterweight 22.

Figure 2:
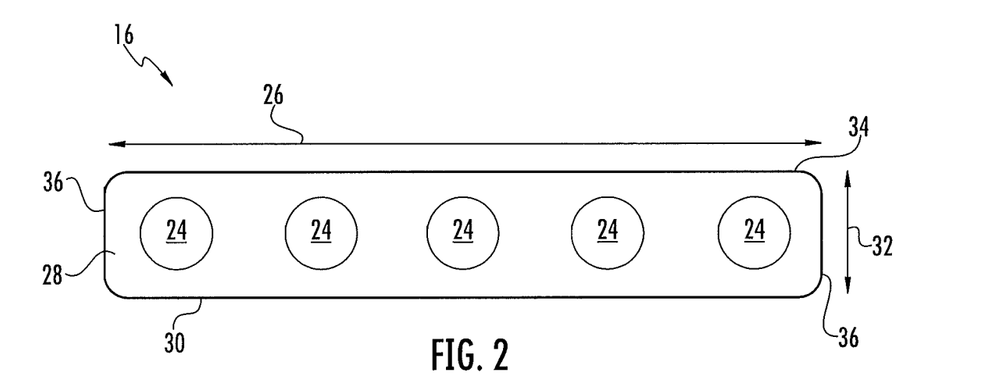
FIG. 2 is a cross-sectional view of an embodiment of an elevator system belt.

FIG. 2 provides a cross-sectional schematic of an exemplary belt 16 construction or design. The belt 16 includes a plurality of tension members 24 extending longitudinally along the belt 16 and arranged across a belt width 26. The tension members 24 are at least partially enclosed in a jacket 28 to restrain movement of the tension members 24 in the belt 16 with respect to each other and to protect the tension members 24. The jacket 28 defines a traction side 30 configured to interact with a corresponding surface of the traction sheave 52. A primary function of the jacket 28 is to provide a sufficient coefficient of friction between the belt 16 and the traction sheave 52 to produce a desired amount of traction therebetween. The jacket 28 should also transmit the traction loads to the tension members 24. In addition, the jacket 28 should be wear resistant and protect the tension members 24 from impact damage, exposure to environmental factors, such as chemicals, for example.

The belt 16 has a belt width 26 and a belt thickness 32, with an aspect ratio of belt width 26 to belt thickness 32 greater than one. The belt 16 further includes a back side 34 opposite the traction side 30 and belt edges 36 extending between the traction side 30 and the back side 34. While five tension members 24 are illustrated in the embodiment of FIG. 2, other embodiments may include other numbers of tension members 24, for example, 6, 10 or 12 tension members 24. Further, while the tension members 24 of the embodiment of FIG. 2 are substantially identical, in other embodiments, the tension members 24 may differ from one another. While a belt 16 with a rectangular cross-section is illustrated in FIG. 2, it is to be appreciated that belts 16 having other cross-sectional shapes are contemplated within the scope of the present disclosure.

Figure 2A:
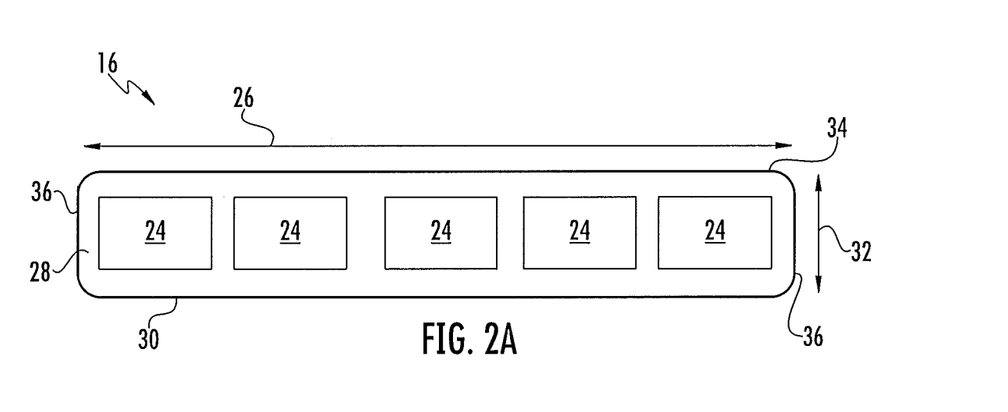
FIG. 2A is another cross-sectional view of an embodiment of an elevator system belt.
Figure 3A:
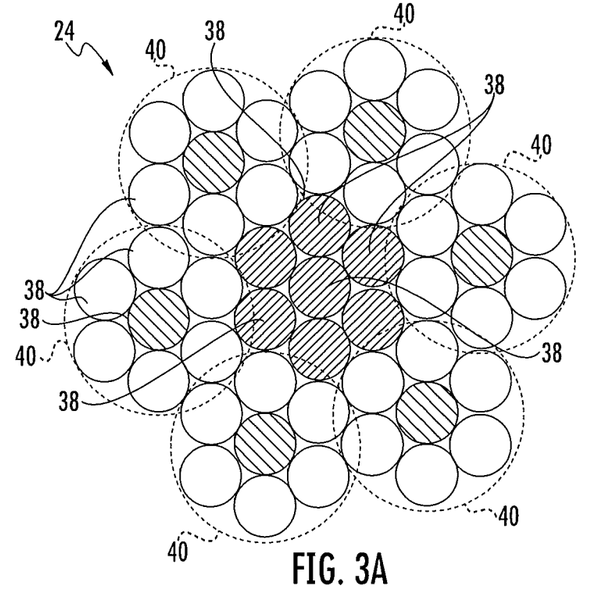
FIG. 3A is a cross-sectional view of an embodiment of a tension member for an elevator belt.
Figure 3B:
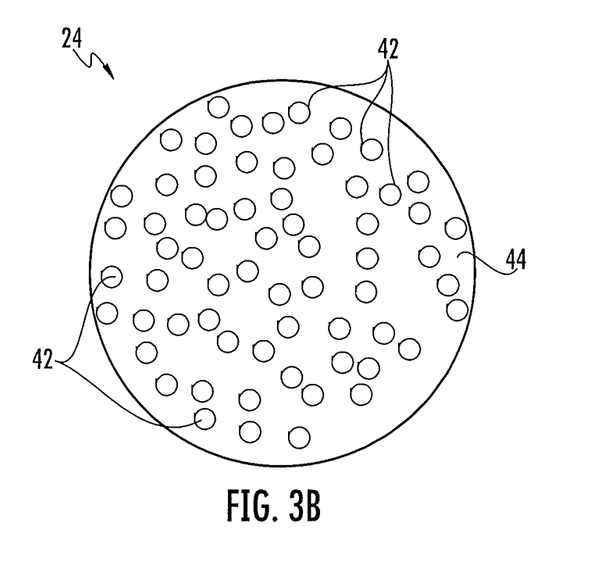
FIG. 3B is another cross-sectional view of an embodiment of a tension member for an elevator belt.

Referring now to FIG. 3A, the tension member 24 may be a plurality of wires 38, for example, steel wires 38, which in some embodiments are formed into one or more strands 40. In other embodiments, such as shown in FIG. 3B, the tension member 24 may include a plurality of fibers 42, such as carbon fiber, glass fiber aramid fiber, or their combination, disposed in a matrix material 44. Materials such as polyurethane, vinylester, or epoxy may be utilized as the matrix material, as well as other thermoset materials and, for example, thermoset polyurethane materials. While a circular cross-sectional tension member geometry is illustrated in the embodiment of FIG. 3B, other embodiments may include different tension member cross-sectional geometries, such as rectangular (shown in FIG. 2A) or ellipsoidal. While the cross-sectional geometries of the tension members 24 in FIG. 2 are shown as identical, in other embodiment the tension members' cross-sectional geometries may differ from one another.

Figure 4:
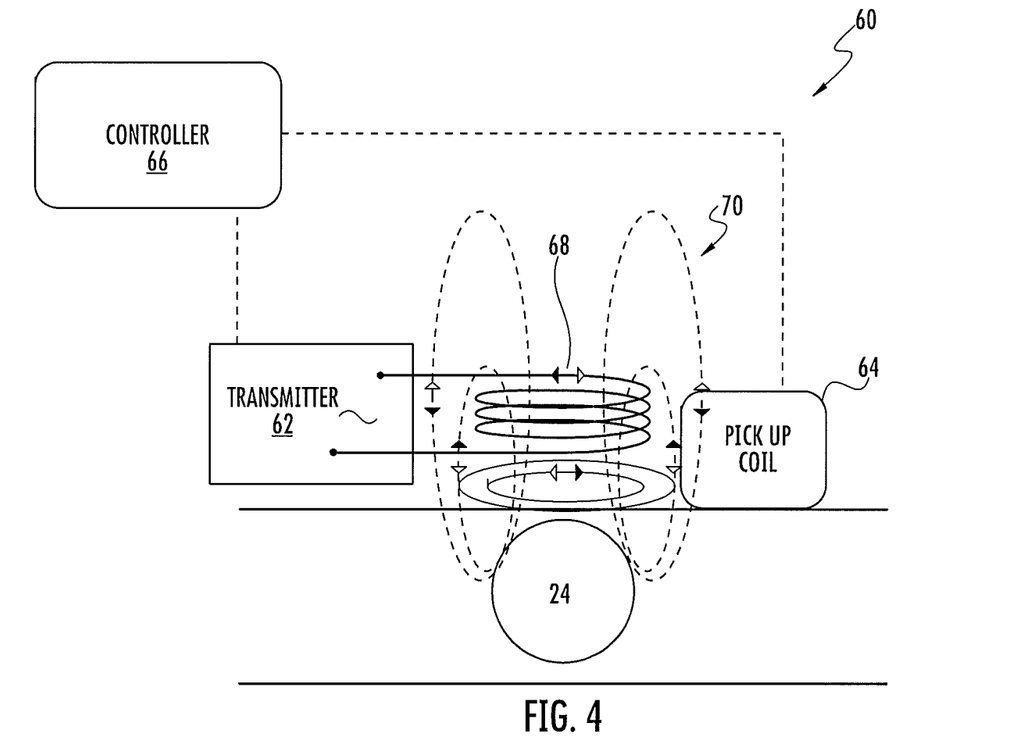
FIG. 4 is a schematic view of an eddy current health monitoring system for an elevator system tension member.
Figure 5:
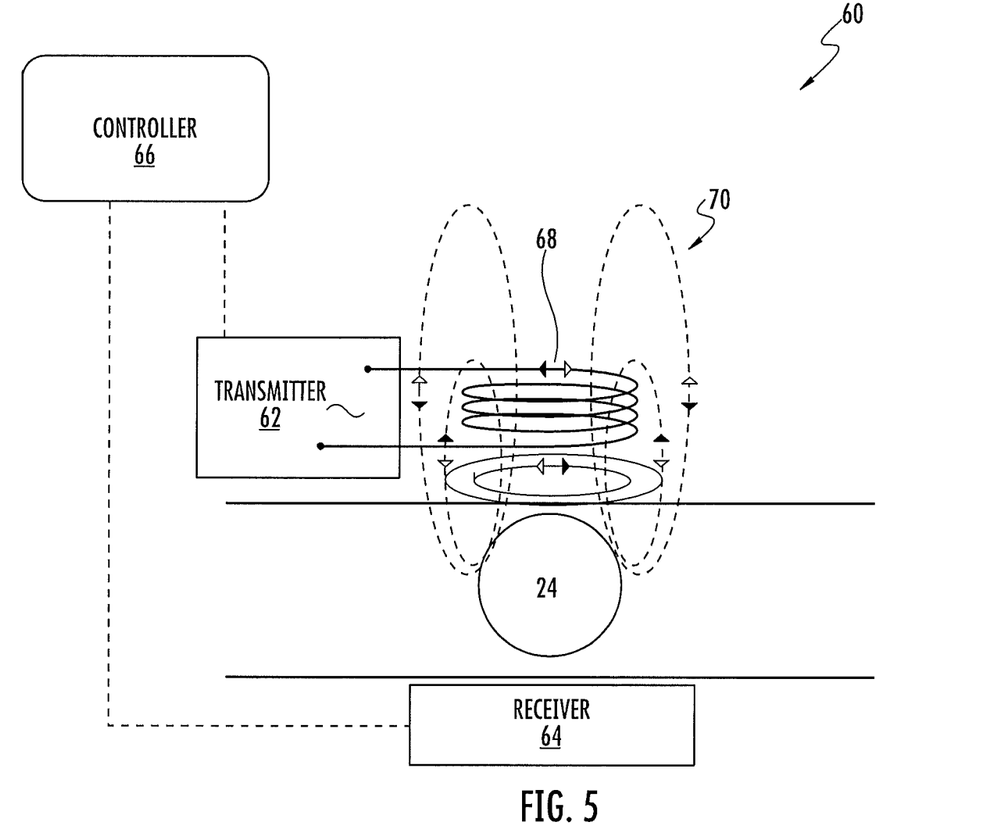
FIG. 5 is another schematic view of an eddy current health monitoring system for an elevator system tension member.

Referring now to FIG. 4, illustrated is a health monitoring system 60 for the electrically-conductive tension members 24 of the belts 16, including those with steel tension members 24 as well as those having non-metallic tension members 24 formed, for example, from the plurality of fibers 42 suspended in a matrix material 44. The health monitoring system 60 is an eddy current system having a transmitter 62 and a receiver 64 operably connected to a controller 66. In some embodiments, such as shown in FIG. 4, the transmitter 62 and the receiver 64 are located at a same belt surface while in other embodiments, the system is a through transmission system such as shown in FIG. 5. In such a system, the transmitter and the receiver 64 are located at opposing sides of the belt 16. The transmitter 62 includes a transmitter coil 68 through which an alternating current is flowed as directed by the controller 66, generating an oscillating magnetic field, depicted schematically at 70. Fluctuations in the magnetic field detected at the receiver 64, manifested in a change in impedance at the receiver 64, are indicative of irregularities in the tension members 24. Irregularities include breakage of fibers 42 or of the plurality of fibers 42, or breakage of wires, as a result of fatigue or impact damage. Further, fabrication-related anomalies such as wrinkled fibers, variations in fiber density and/or amount of inter-fiber contact also cause local variations which are detected via eddy current evaluation. Further, variations in the matrix material 44, such as voids, may also be detected.

In the embodiment of FIG. 4, the evaluation utilizing the health monitoring system 60 is performed on the belt 16 at selected service intervals by a technician who utilizes the health monitoring system 60 as a field tool. It is to be appreciated that the evaluation may take place either in the hoistway 12, with the belt 16 in its installed position, or alternatively outside of the hoistway 12.

Figure 6:
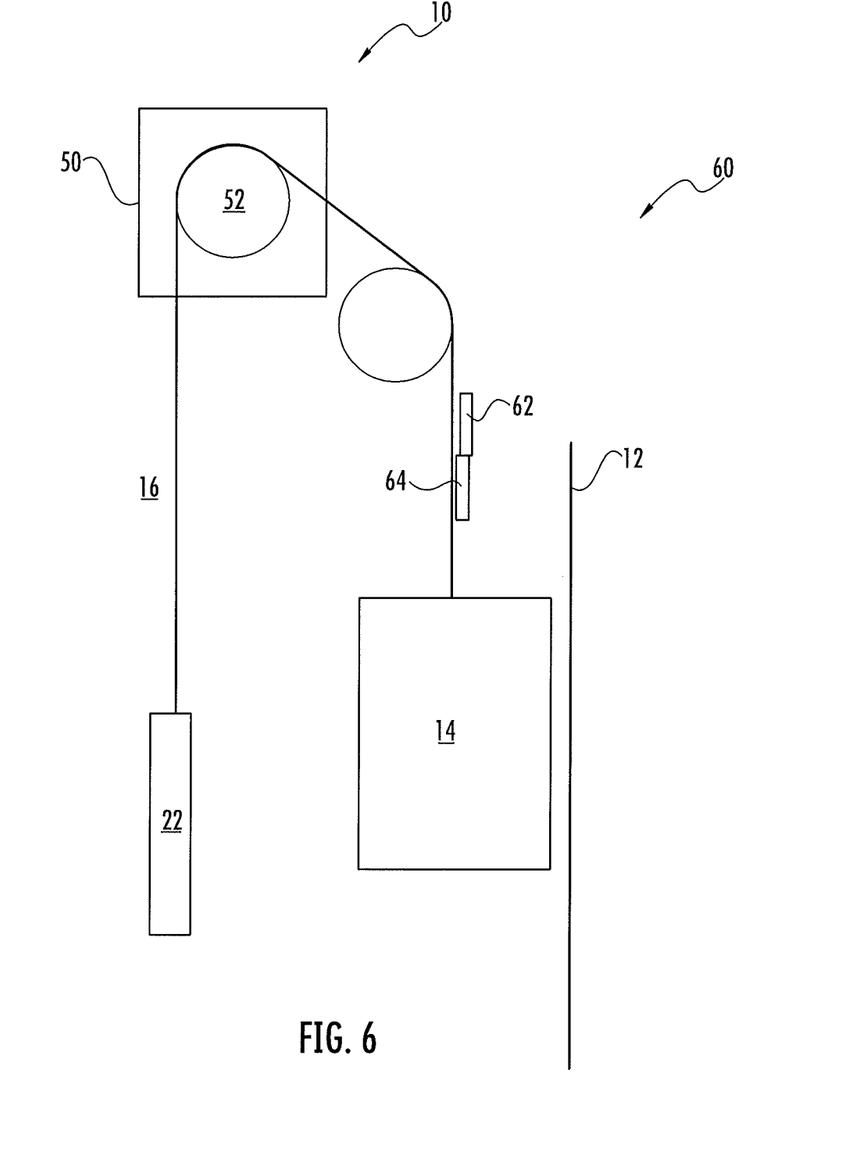
FIG. 6 is yet another schematic view of an eddy current health monitoring system for an elevator system tension member.
Figure 7:
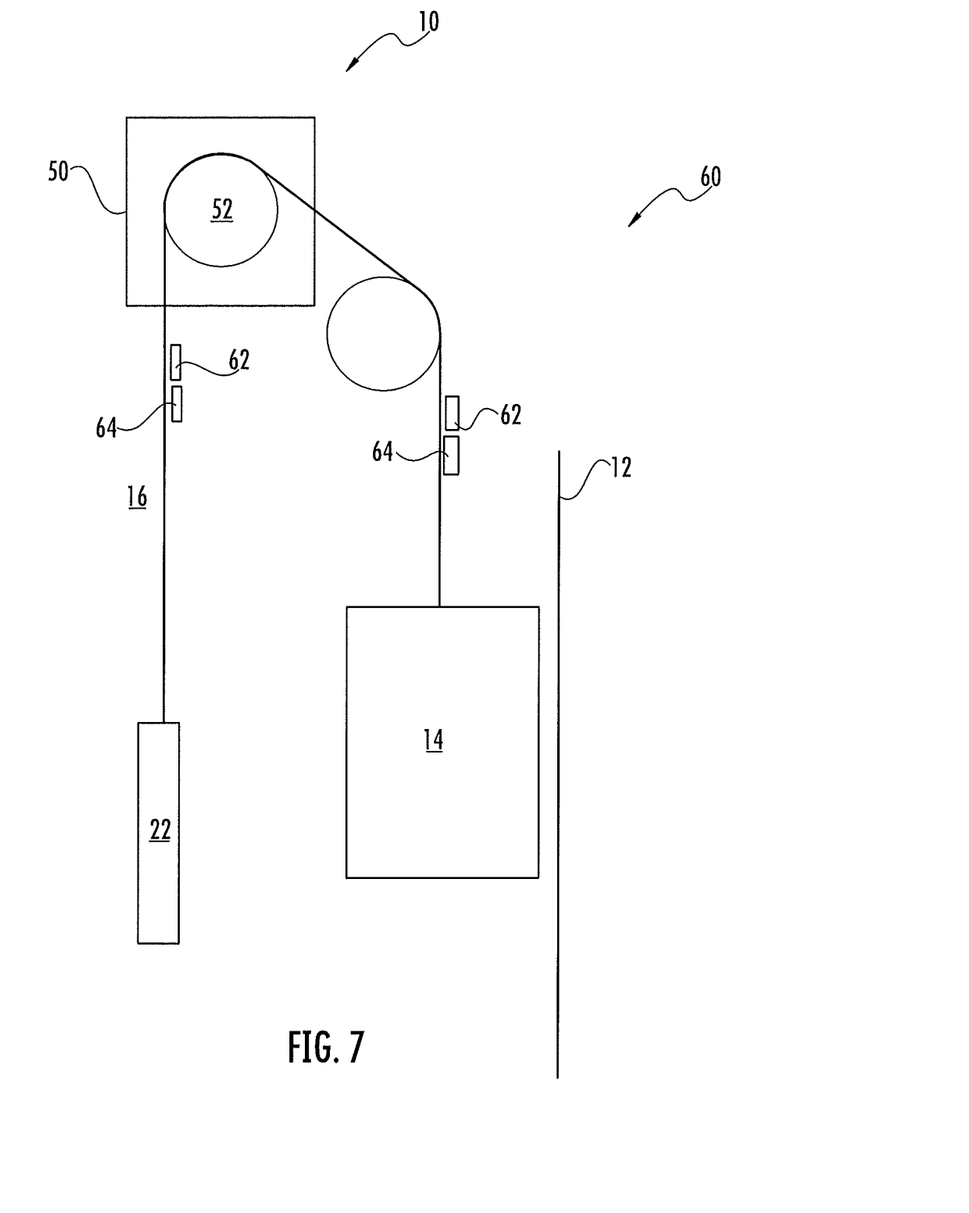
FIG. 7 is still another schematic view of an eddy current health monitoring system for an elevator system tension member.

In another embodiment, referring now to FIG. 6, the health monitoring system 60 may provide constant monitoring of the tension members 24 by, for example, mounting the health monitoring system 60 in the hoistway 12, with the transmitter 62 and the receiver 64 located at the same side of the belt 16. In some embodiments, a single transmitter 62 and receiver 64 combination may be utilized, while in other embodiments, multiple sets of transmitters 62 and receivers 64 may be used to monitor different portions of the belt 16, such as different tension members 24 of the belt 16. In some embodiments, such as shown in FIG. 7, the positions of the sets of transmitters 62 and receivers 64 may be staggered along the hoistway 12 to prevent interference and/or distortion of the evaluations.

Referring again to FIG. 5, with the health monitoring system 60 positioned in the hoistway 12, the condition of the tension members 24 may be continuously monitored, or alternatively evaluations may be performed at selected time intervals. Further, position information obtainable from an elevator control system 70 may be used together with the controller 66 of the health monitoring system 60 to locate and map any anomalies or damage to the tension members 24. Such anomalies or damage may be subject to further inspection, or may be used as a baseline or reference in future evaluations, such that any progression or worsening of the tension member 24 condition may be determined.

Use of the health monitoring system 60, which evaluates condition of the elevator belt 16 tension members 24 via non-contact eddy current inspection, provides an inspection method sensitive to breakage or damage of non-metallic tension members 24 of elevator systems 10, and allows for determining a location of such damage on the tension member 24. Thus, a weakest point of the tension member 24 may be determined, rather than merely the overall strength of the tension member 24, as with other evaluation systems and methods.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A health monitoring system for an electrically-conductive tension member of an elevator system belt, comprising:
   a transmitter including a transmitter coil configured for placement at the tension member;
   a receiver configured to be positioned at the tension member; and
   a controller operably connected to the transmitter and the receiver, the controller configured to:
      direct an alternating current through the transmitter coil, resulting in the generation of a magnetic field and eddy currents at the transmitter coil; and
      evaluate fluctuations in the magnetic field detected at the receiver, the fluctuations indicative of wear or damage to the tension member;
   wherein the controller is configured to obtain position information from an elevator control system to locate and map locations of wear or damage of the tension member;
   wherein the transmitter and the receiver are disposed at a same side of the tension member; and
   wherein a position of the receiver is offset from a position of the transmitter relative to a lengthwise direction of the tension member.

2. The health monitoring system of claim 1, wherein the controller is configured to identify a weakest location of the tension member.

3. The health monitoring system of claim 1, wherein the controller is configured to compare a present evaluation to one or more previous evaluations to determine progression of damage or wear of a tension member.

4. The health monitoring system of claim 1, further comprising multiple sets of transmitters and receivers, each set configured to evaluate a portion of the tension member; each set disposed at differing locations along a lengthwise direction of the tension member.

5. The health monitoring system of claim 1, wherein the wear or damage includes one or more of breakage of the tension member, wrinkled fibers, variations in fiber density and/or amount of inter-fiber contact, or variations in a matrix material of the tension member.

6. An elevator system, comprising:
   a hoistway;

an elevator car movable along the hoistway;
one or more electrically-conductive tension members operably connected to the elevator car to move the elevator car along the hoistway; and
a health monitoring system for the one or more tension members, including:
   a transmitter including a transmitter coil located the tension member;
   a receiver located at the tension member; and
   a controller operably connected to the transmitter and the receiver, the controller configured to:
      direct an alternating current through the transmitter coil, resulting in the generation of a magnetic field and eddy currents at the transmitter coil; and
      evaluate fluctuations in the magnetic field detected at the receiver, the fluctuations indicative of wear or damage to the tension member;
   wherein the controller is configured to obtain position information from an elevator control system to locate and map locations of wear or damage of the tension member;
   wherein the transmitter and the receiver are disposed at a same side of the tension member; and
   wherein a position of the receiver is offset from a position of the transmitter relative to a lengthwise direction of the tension member.

7. The elevator system of claim 6, wherein the health monitoring system is configured for continuous monitoring of the tension member.

8. The elevator system of claim 6, wherein the controller is configured to compare a present evaluation to one or more previous evaluations to determine progression of damage or wear of a tension member.

9. The elevator system of claim 6, further comprising multiple sets of transmitters and receivers, each configured to evaluate at least one tension member of the one or more tension members.

10. The elevator system of claim 9, wherein the sets of transmitters and receivers are disposed at different locations along the lengthwise direction of the tension member.

11. The elevator system of claim 6, wherein the tension member comprises a plurality of fibers disposed in a matrix material.

12. The elevator system of claim 11, wherein the wear or damage includes one or more of breakage of fibers of the tension member, wrinkled fibers, variations in fiber density and/or amount of inter-fiber contact, or variations in a matrix material of the tension member.

13. The elevator system of claim 6, wherein the one or more tension members are retained in a jacket.

14. A method of health monitoring of an electrically-conductive tension member of an elevator system, comprising:
   directing an alternating current through a coil of a transmitter located at a tension member of an elevator system;
   generating one or more magnetic fields and eddy currents at the transmitter via the alternating current;
   evaluating the tension member by detecting fluctuations in the magnetic field at a receiver located at the tension member, the fluctuations indicative of wear and or damage to the tension member; and
   locating and mapping locations of wear or damage of the tension member on the tension member utilizing position information obtained via communication with an elevator control system;
   wherein the transmitter and the receiver are disposed at a same side of the tension member; and
   wherein a position of the receiver is offset from a position of the transmitter relative to a lengthwise direction of the tension member.

15. The method of claim 14, further comprising comparing a present evaluation to one or more previous evaluations to determine progression of damage or wear of a tension member.

16. The method of claim 14, further comprising evaluating multiple tension members of the elevator system via multiple sets of transmitters and receivers disposed at different locations along the lengthwise direction of the tension members.

17. The method of claim 14, wherein the tension member comprises a plurality of fibers disposed in a matrix material.

18. The method of claim 14, wherein the wear or damage includes one or more of breakage of fibers of the tension member, wrinkled fibers, variations in fiber density and/or amount of inter-fiber contact, or variations in a matrix material of the tension member.

19. The elevator system of claim 6, wherein the tension members are arrayed in a belt having a plurality of tension members at least partially enclosed in a jacket.

* * * * *